United States Patent [19]
Shimizu et al.

[11] Patent Number: 5,731,669
[45] Date of Patent: Mar. 24, 1998

[54] CONTROL APPARATUS FOR ELECTRIC VEHICLE

[75] Inventors: Takumi Shimizu, Kariya; Tsuneyuki Egami, Gamagoori, both of Japan

[73] Assignee: Nippondenso Co., Ltd., Kariya, Japan

[21] Appl. No.: 710,214

[22] Filed: Sep. 13, 1996

[30] Foreign Application Priority Data

Sep. 14, 1995 [JP] Japan ................. 7-237005

[51] Int. Cl.⁶ .................. B60L 9/00; H02P 7/00
[52] U.S. Cl. .................. 318/139; 318/587; 318/432; 318/719; 318/800
[58] Field of Search .................. 318/138, 139, 318/245, 254, 560–696, 800–832; 364/424.06, 424.02, 424.01; 477/20, 15; 74/866; 361/28–32; 363/40, 39

[56] References Cited

U.S. PATENT DOCUMENTS

| | | | |
|---|---|---|---|
| 5,355,749 | 10/1994 | Obara et al. | 477/20 |
| 5,442,268 | 8/1995 | Goodarzi et al. | 318/432 |
| 5,453,930 | 9/1995 | Imaseki et al. | 364/424.01 |
| 5,461,531 | 10/1995 | Tuchiya et al. | 361/28 |
| 5,467,275 | 11/1995 | Takamoto et al. | 318/587 |
| 5,481,168 | 1/1996 | Mutoh et al. | 318/432 |
| 5,532,571 | 7/1996 | Masaki et al. | 318/809 |
| 5,534,764 | 7/1996 | Masaki et al. | 318/802 |
| 5,566,072 | 10/1996 | Momose et al. | 364/436 |
| 5,568,024 | 10/1996 | Suzuki | 318/139 |
| 5,583,406 | 12/1996 | Mutoh et al. | 318/376 |
| 5,583,411 | 12/1996 | Kusano et al. | 318/719 |
| 5,592,355 | 1/1997 | Ikkai et al. | 361/94 |
| 5,610,483 | 3/1997 | Obara et al. | 318/139 |

FOREIGN PATENT DOCUMENTS

| | | |
|---|---|---|
| 60-084903 | 5/1985 | Japan . |
| 5-236607 | 9/1993 | Japan . |
| 6-090507 | 3/1994 | Japan . |
| 6-141402 | 5/1994 | Japan . |
| 6-245577 | 9/1994 | Japan . |

Primary Examiner—Paul Ip
Attorney, Agent, or Firm—Cushman Darby & Cushman IP Group of Pillsbury Madison & Sutro LLP

[57] ABSTRACT

A control apparatus for an electric vehicle includes a device for detecting a degree of depression of an accelerator pedal in the electric vehicle, and for outputting an accelerator depression degree signal representing the detected degree of depression of the accelerator pedal. A polyphase ac motor is operative for driving the electric vehicle. A rotational speed of the polyphase ac motor is detected, and a motor rotational speed signal is generated which represents the detected rotational speed of the polyphase ac motor. A battery in the vehicle generates dc power. An inverter changes the dc power into ac power through pulse width modulation responsive to a PWM modulation signal, and outputs the ac power to the polyphase ac motor to drive the latter. A steady torque command value is calculated on the basis of the motor rotational speed signal and the accelerator depression degree signal. A transient torque command value is calculated on the basis of a rate of a variation in the accelerator depression degree signal. A torque command value calculating device is operative for calculating a command value of a torque generated by the polyphase ac motor on the basis of the steady torque command value and the transient torque command value. A motor control device is operative for generating the PWM modulation signal in response to the torque command value calculated by the torque command value calculating device, and for outputting the PWM modulation signal to the inverter to control the polyphase ac motor.

7 Claims, 11 Drawing Sheets

CONTROL APPARATUS FOR ELECTRIC VEHICLE

BACKGROUND OF THE INVENTION

1. Field of the Invention

This invention relates to a control apparatus for an electric vehicle.

2. Description of the Prior Art

A voltage-type PWM (pulse width modulation) inverter apparatus features that the levels and the frequencies of its output voltages can be accurately and quickly controlled. It is well-known to use such an inverter apparatus in driving a polyphase ac motor at a variable speed. An electric vehicle of a typical type uses a polyphase ac motor as a vehicle power source which is driven and controlled by a voltage-type PWM inverter apparatus.

In some cases, the frequencies of the output voltages of the inverter apparatus are continuously varied in a wide range including a dc frequency point (0 Hz). In such cases, when the frequencies of the output voltages are relatively low, a given arm among arms of a polyphase bridge in the inverter apparatus is subjected to a continuous current lasting for a long time. Accordingly, a loss concentrates on a circuit element (for example, a switching device) related to the given arm. To protect the circuit element related to the given arm, the inverter apparatus is operated at a reduced power.

Japanese published unexamined patent application 6-245577 discloses a PWM control apparatus for a three-phase ac motor. The PWM control apparatus in Japanese application 6-245577 includes a CPU for generating three-phase voltage reference signals V, and a PWM control circuit for modulating the signals V into three-phase gate pulse signals GP in response to a carrier signal CR. The three-phase ac motor is driven and controlled via a voltage-type inverter in response to the three-phase gate pulse signals GP.

In the PWM control apparatus of Japanese application 6-245577, the CPU executes calculations for speed control and vector control, thereby generating three-phase voltage reference signals V* and a frequency reference signal F* in response to a speed reference signal Ωr*, a speed feedback signal Ωr, and a current feedback signal I. The CPU generates a mode signal MD in response to the three-phase voltage reference signals V*. The CPU generates a corrective signal Vc in response to the frequency reference signal F*. The CPU corrects the three-phase voltage reference signals V* into the three-phase voltage reference signals V** in response to the mode signal MD and the corrective signal Vc.

In the PWM control apparatus of Japanese application 6-245577, the mode signal MD is changed in its state at a period corresponding to about 60° in phase of the voltage reference. The polarity of the corrective signal Vc is opposite to the polarity of one out of the three-phase voltage reference signals V* which has the greatest amplitude. The three-phase voltage reference signals V** are generated by adding or subtracting the corrective signal Vc to or from the three-phase voltage reference signals V*. Thereby, the current rate related to a given arm among arms of a polyphase bridge in the voltage-type inverter can be reduced without changing the inter-line voltages. Thus, it is possible to prevent a loss from concentrating on a circuit element (for example, a switching device) related to the given arm.

Japanese published unexamined patent application 6-141402 discloses a control apparatus for an inverter having switching elements. In the control apparatus of Japanese application 6-141402, the frequency of state change of the switching elements is varied in accordance with the load on the inverter. Specifically, when the load is great, the frequency of state change of the switching elements is set low to reduce or suppress a loss in the inverter. When the load is small, the frequency of state change of the switching elements is set higher than an audible range to reduce or suppress audible noise generated by the inverter.

SUMMARY OF THE INVENTION

It is an object of this invention to provide an improved control apparatus for an electric vehicle.

The first aspect of this invention provides a control apparatus for an electric vehicle which includes accelerator depression degree detecting means for detecting a degree of depression of an accelerator pedal in the electric vehicle, and for outputting an accelerator depression degree signal representing the detected degree of depression of the accelerator pedal, and a polyphase ac motor for driving the electric vehicle. The control apparatus also includes motor rotation detecting means for detecting a rotational speed of the polyphase ac motor, and for outputting a motor rotational speed signal representing the detected rotational speed of the polyphase ac motor, a battery in the vehicle for generating dc power, and an inverter for changing the dc power generated by the battery into ac power through pulse width modulation responsive to a PWM modulation signal, and for outputting the ac power to the polyphase ac motor to drive the polyphase ac motor. The control apparatus further includes steady torque calculating means for calculating a command value of a steady torque generated by the polyphase ac motor on the basis of the motor rotational speed signal and the accelerator depression degree signal, and transient torque calculating means for deriving a rate of a variation in the accelerator depression degree signal, and for calculating a transient torque command value on the basis of the variation rate of the accelerator depression degree signal. The control apparatus also includes torque command value calculating means for calculating a command value of a torque generated by the polyphase ac motor on the basis of the steady torque command value and the transient torque command value; and motor control means for generating the PWM modulation signal in response to the torque command value calculated by the torque command value calculating means, and for outputting the PWM modulation signal to the inverter to control the polyphase ac motor.

The second aspect of this invention is based on the first aspect thereof, and provides a control apparatus wherein the torque command value calculating means is operative for calculating the torque command value by adding the steady torque command value and the transient torque command value.

The third aspect of this invention is based on the first aspect thereof, and provides a control apparatus wherein the steady torque calculating means is operative for calculating the steady torque command value which corresponds to a maximum value of output of the inverter when the motor rotational speed is equal to or higher than a given speed, which decreases as the motor rotational speed decreases from the given speed, and which is equal to a given value smaller than the maximum value of output of the inverter when the motor rotational speed is zero.

The fourth aspect of this invention is based on the first aspect thereof, and provides a control apparatus wherein the transient torque calculating means is operative for calculating an initial value on the basis of the variation rate of the accelerator depression degree signal, and for calculating the transient torque command value which decreases from the initial value in accordance with a lapse of time.

The fifth aspect of this invention is based on the fourth aspect thereof, and provides a control apparatus further comprising a temperature sensor for detecting a temperature of the inverter, and wherein the transient torque calculating means is operative for changing the initial value and a rate of the decrease in the transient torque command value in response to the inverter temperature detected by the temperature sensor.

The sixth aspect of this invention provides a control apparatus for an electric vehicle having an accelerator pedal, the apparatus comprising first means for detecting a degree of depression of the accelerator pedal, and second means connected to the first means for calculating a rate of an increase in the accelerator pedal depression degree detected by the first means. The control apparatus includes a polyphase ac motor for driving the electric vehicle, third means connected to the polyphase ac motor for detecting a rotational speed of the polyphase ac motor, and fourth means connected to the first means, the second means, the polyphase ac motor. The third means controls the polyphase ac motor in response to the accelerator pedal depression degree detected by the first means, the increase rate calculated by the second means, and the rotational speed detected by the third means.

The seventh aspect of this invention is based on the sixth aspect thereof, and provides a control apparatus wherein the fourth means comprises an inverter connected to the polyphase ac motor for driving the polyphase ac motor, fifth means connected to the inverter for detecting a temperature of the inverter, and sixth means connected to the polyphase ac motor and the fifth means for controlling the polyphase ac motor in response to the inverter temperature detected by the fifth means.

The eighth aspect of this invention provides a control apparatus for an electric vehicle having an accelerator pedal, the apparatus including first means for detecting a degree of depression of the accelerator pedal, and second means connected to the first means for calculating a rate of an increase in the accelerator pedal depression degree detected by the first means. The control apparatus also includes a polyphase ac motor for driving the electric vehicle, third means connected to the polyphase ac motor for detecting a rotational speed of the polyphase ac motor, and fourth means connected to the first means and the third means for calculating a first command value on the basis of the accelerator pedal depression degree detected by the first means and the motor rotational speed detected by the third means. The first command value relates to a torque generated by the polyphase ac motor. The control apparatus further includes fifth means connected to the second means for calculating a second command value on the basis of the increase rate calculated by the second means, the second command value relating to the torque generated by the polyphase ac motor, and sixth means connected to the fourth means and the fifth means for calculating a third command value on the basis of the first command value calculated by the fourth means and the second command value calculated by the fifth means. The third command value relates to the torque generated by the polyphase ac motor. The control apparatus also includes seventh means connected to the sixth means and the polyphase ac motor for controlling the polyphase ac motor in response to the third command value calculated by the sixth means.

The ninth aspect of this invention provides a control apparatus further comprising an inverter provided in the seventh means and connected to the polyphase ac motor for driving the polyphase ac motor, eighth means connected to the inverter for detecting a temperature of the inverter, and ninth means connected to the fifth means and the eighth means for varying the second command value in response to the inverter temperature detected by the eighth means.

DESCRIPTION OF THE PREFERRED EMBODIMENTS

First Embodiment

Figure 1:
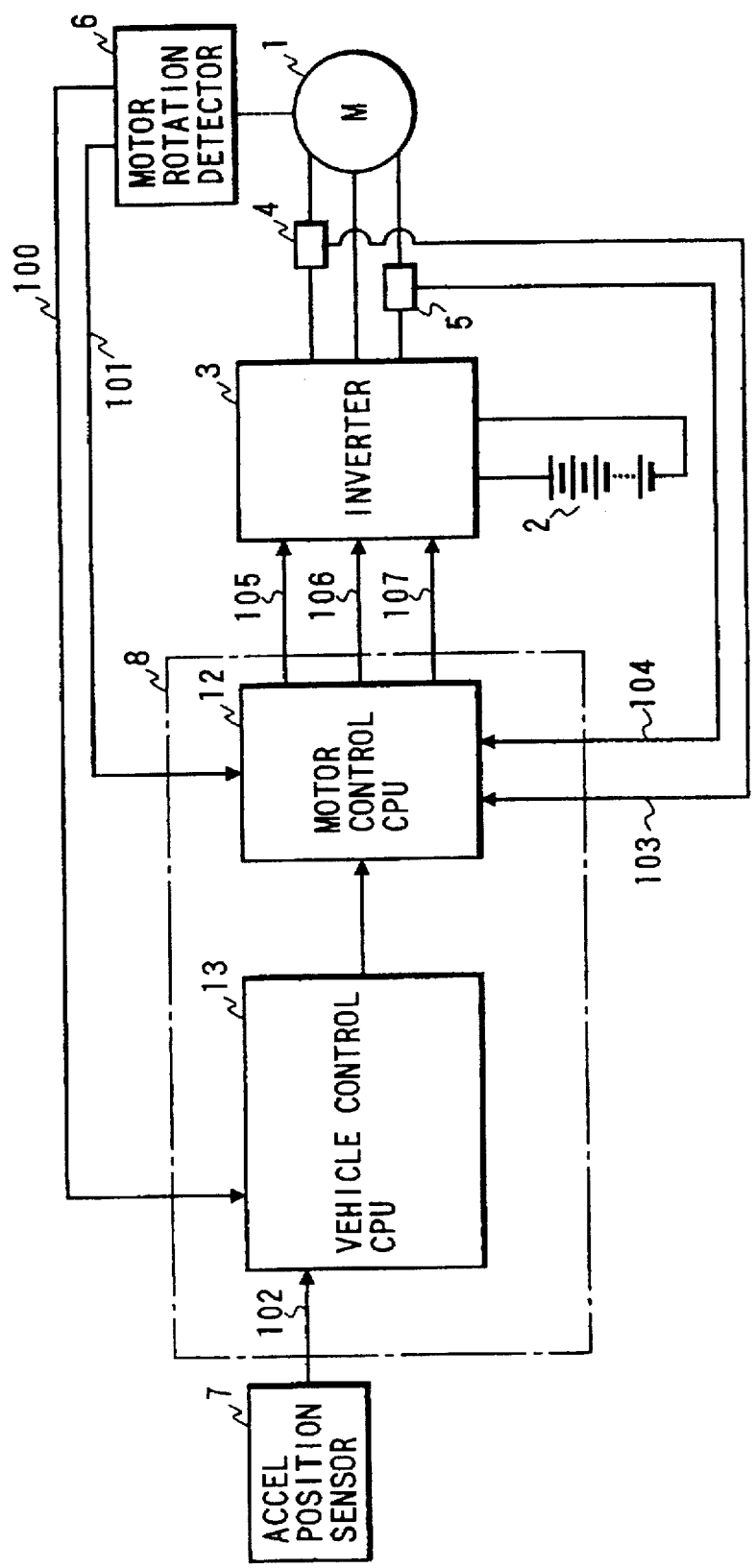
FIG. 1 is a block diagram of a control apparatus according to a first embodiment of this invention.

With reference to FIG. 1, a polyphase ac motor 1 is mounted on an electric vehicle. The polyphase ac motor 1 serves to drive the electric vehicle. The polyphase ac motor 1 is of, for example, three-phase brushless type. A battery 2 mounted on the electric vehicle includes, for example, a lead acid battery. An inverter 3 is connected between the polyphase ac motor 1 and the battery 2. The inverter 3 receives dc power from the battery 2, and converts the received dc power into ac power. The inverter 3 feeds the ac power to the polyphase ac motor 1. The polyphase ac motor 1 is driven by the ac power fed from the inverter 3.

The polyphase ac motor (the three-phase ac motor) 1 has three windings corresponding to U, V, and W phases respectively. Three power feed lines extend from the inverter 3 to the U-phase, V-phase, and W-phase windings of the polyphase ac motor 1 respectively.

A current sensor 4 associated with the U-phase power feed line between the polyphase ac motor 1 and the inverter 3 detects a U-phase current flowing in the U-phase winding of the polyphase ac motor 1. The current sensor 4 outputs a voltage to a signal line 103 which represents the detected U-phase current. Thus, the current sensor 4 outputs a U-phase current signal to the signal line 103. The signal line 103 leads to a motor control CPU 12 within a control unit 8.

A current sensor 5 associated with the W-phase power feed line between the polyphase ac motor 1 and the inverter 3 detects a W-phase current flowing in the W-phase winding of the polyphase ac motor 1. The current sensor 5 outputs a voltage to a signal line 104 which represents the detected W-phase current. Thus, the current sensor 5 outputs a W-phase current signal to the signal line 104. The signal line 104 leads to the motor control CPU 12 within the control unit 8.

A motor rotation detector 6 associated with the polyphase ac motor 1 serves to detect the rotational speed of the motor 1 and the angular position of the rotor in the motor 1. The motor rotation detector 6 includes, for example, a resolver and an R/D converter circuit. The motor rotation detector 6 outputs a train of pulses to a signal line 100 which represents the detected rotational speed of the polyphase ac motor 1. Thus, the motor rotation detector 6 outputs a motor rotational speed signal to the signal line 100. The signal line 100 leads to a vehicle control CPU 13 within the control unit 8. A pulse in the rotational speed signal occurs for every rotation of the rotor of the polyphase ac motor 1 through a given unit angle. The motor rotation detector 6 outputs an 8-bit serial-form signal to a signal line 101 which represents the detected angular position of the rotor in the polyphase ac motor 1. Thus, the motor rotation detector 6 outputs a rotor position signal to the signal line 101. The signal line 101 leads to the motor control CPU 12 within the control unit 8.

An accelerator position sensor 7 connected to an accelerator pedal in the electric vehicle outputs a voltage to a signal line 102 which represents the degree of depression of the accelerator pedal. Thus, the accelerator position sensor 7 outputs an accelerator position signal to the signal line 102. The signal line 102 leads to the vehicle control CPU 13 within the control unit 8. The accelerator position sensor 7 includes, for example, a potentiometer having a control arm which is moved as the accelerator pedal is operated.

The control unit 8 receives the U-phase current signal from the current sensor 4. The control unit 8 receives the W-phase current signal from the current sensor 5. The control unit 8 receives the motor rotational speed signal and the rotor position signal from the motor rotation detector 6. The control unit 8 receives the accelerator position signal from the accelerator position sensor 7. The control unit 8 generates a U-phase drive signal VU*, a V-phase drive signal VV*, and a W-phase drive signal VW* in response to the U-phase current signal, the W-phase current signal, the motor rotational speed signal, the rotor position signal, and the accelerator position signal. The control unit 8 outputs the U-phase drive signal VU*, the V-phase drive signal VV*, and the W-phase drive signal VW* to signal lines 105, 106, and 107 leading to the inverter 3 respectively. Thus, the U-phase drive signal VU*, the V-phase drive signal VV*, and the W-phase drive signal VW* are transmitted from the control unit 8 to the inverter 3.

In the control unit 8, the motor control CPU 12 and the vehicle control CPU 13 are connected to each other. The motor control CPU 12 includes a combination of an input/output port, a processing section, a ROM, and a RAM. The motor control CPU 12 operates in accordance with a program stored in its internal ROM. The vehicle control CPU 13 includes a combination of an input/output port, a processing section, a ROM, and a RAM. The vehicle control CPU 13 operates in accordance with a program stored in Its internal ROM. The motor control CPU 12 and the vehicle control CPU 13 may include a common CPU.

The vehicle control CPU 13 receives the motor rotational speed signal from the motor rotation detector 6. The vehicle control CPU 13 receives the accelerator position signal from the accelerator position sensor 7. The vehicle control CPU 13 is programmed to derive Information of the present rotational speed of the polyphase ac motor 1 from the motor rotational speed signal, and to derive information of the present degree of depression of the accelerator from the accelerator position signal. Further, the vehicle control CPU 13 is programmed to calculate a torque command value from the present rotational speed of the polyphase ac motor 1 and the present degree of depression of the accelerator pedal. The torque command value means a desired value of the torque output of the polyphase ac motor 1.

Figure 2:
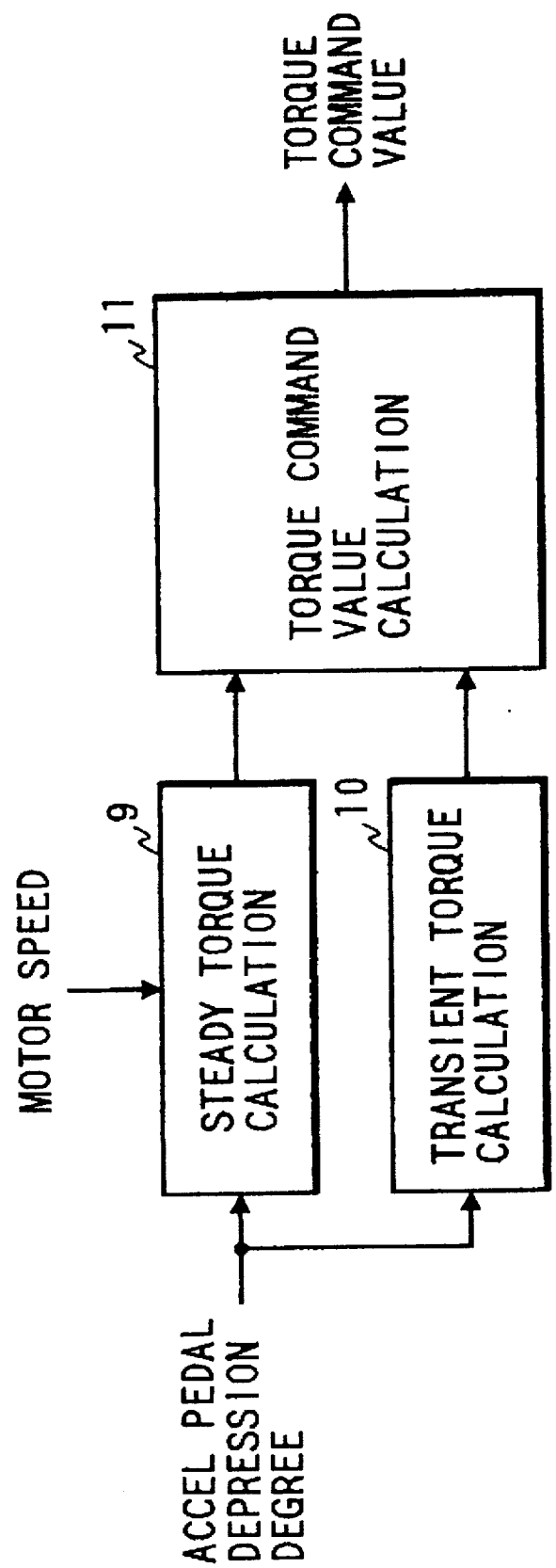
FIG. 2 is a flow diagram of operation of a vehicle control CPU in FIG. 1.

FIG. 2 is a flow diagram of operation of the vehicle control CPU 13. It should be noted that FIG. 2 does not show the structure of the hardware of the vehicle control CPU 13. With reference to FIG. 2, a block 9 derives the present motor rotational speed from the motor rotational speed signal outputted by the motor rotation detector 6. Also, the block 9 derives the present degree of depression of the accelerator pedal from the accelerator position signal outputted by the accelerator position sensor 7. The block 9 calculates a steady torque command value from the present motor rotational speed and the present degree of depression of the accelerator pedal. A block 10 derives the present degree of depression of the accelerator pedal from the accelerator position signal outputted by the accelerator position sensor 7. The block 10 stores the present degree of depression of the accelerator pedal for later use. The block 10 calculates the present rate of a variation in the degree of depression of the accelerator pedal from the previous and present degrees of depression of the accelerator pedal. The block 10 calculates a transient torque command value from the present rate of the variation in the degree of depression of the accelerator pedal. A block 11 is informed of the steady torque command value by the block 9. Also, the block 11 is informed of the transient torque command value by the block 10. The block 11 calculates a torque command value from the steady torque command value and the transient torque command value. The block 11 informs the motor control CPU 12 of the calculated torque command value.

With reference back to FIG. 1, the motor control CPU 12 receives information of the torque command value from the vehicle control CPU 13. The motor control CPU 12 is programmed to calculate a current command vector from the torque command value through a vector calculation process. The motor control CPU 12 receives the U-phase current signal from the current sensor 4. The motor control CPU 12 receives the W-phase current signal from the current sensor 5. The motor control CPU 12 is programmed to generate a U-phase PWM (pulse width modulation) signal, a V-phase PWM signal, and a W-phase PWM signal in response to information of the current command vector, the U-phase current signal, and the W-phase current signal. The motor control CPU 12 outputs the U-phase PWM signal, the V-phase PWM signal, and the W-phase PWM signal to signal lines 105, 106, and 107 respectively. The signal lines 105, 106, and 107 lead to the inverter 3.

The inverter 3 receives the U-phase PWM signal, the V-phase PWM signal, and the W-phase PWM signal from the motor control CPU 12. The inverter 3 feeds an exciting current (a magnetizing current) to the U-phase winding of the polyphase ac motor 1 in response to the U-phase PWM signal. The inverter 3 feeds an exciting current (a magnetizing current) to the V-phase winding of the polyphase ac motor 1 in response to the V-phase PWM signal. The inverter 3 feeds an exciting current (a magnetizing current) to the W-phase winding of the polyphase ac motor 1 in response to the W-phase PWM signal. The polyphase ac motor 1 is driven by the U-phase exciting current, the V-phase exciting current, and the W-phase exciting current so that the torque output of the motor 1 will correspond to the torque command value calculated by the vehicle control CPU 13.

Figure 3:
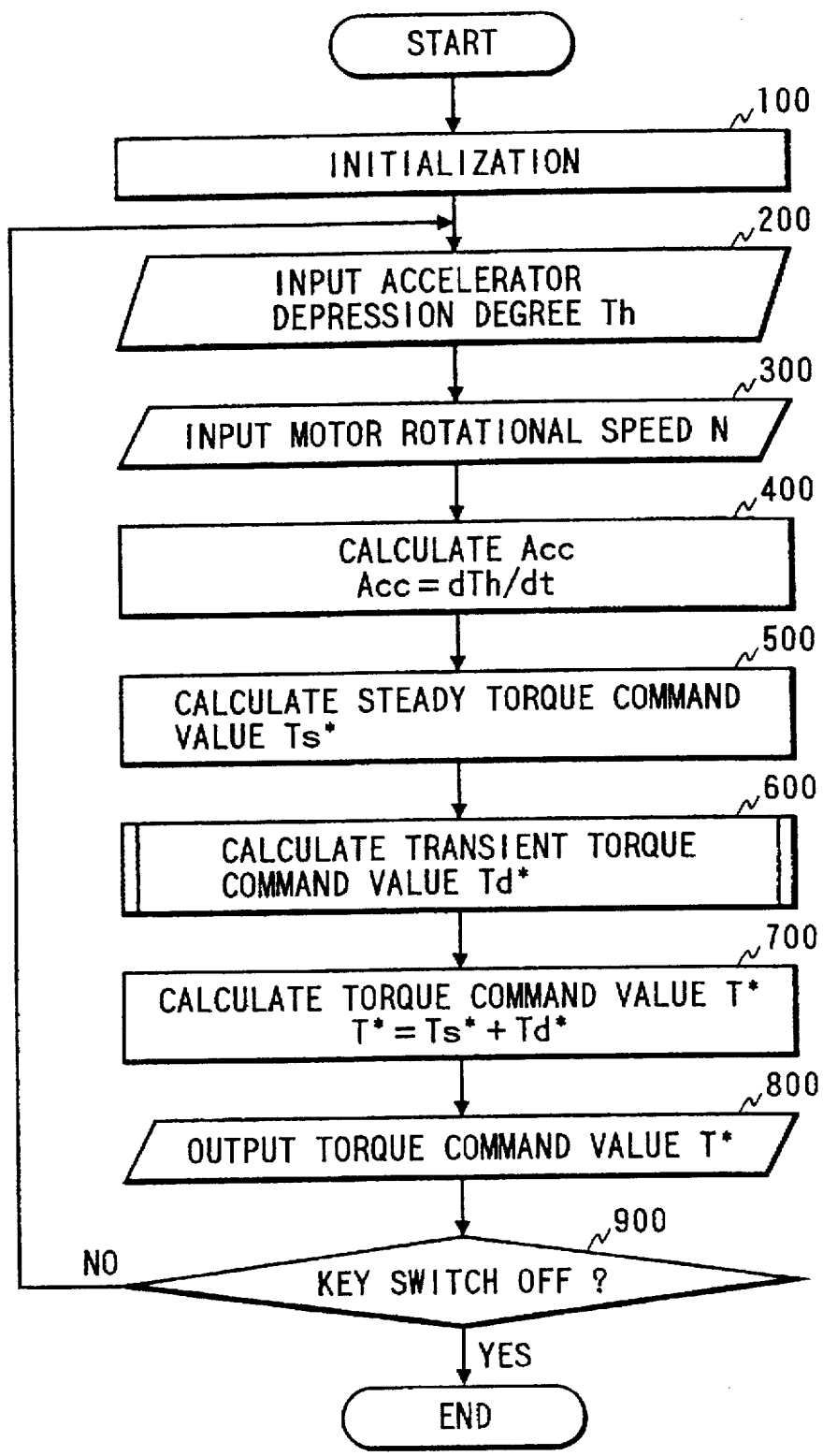
FIG. 3 is a flowchart of a program for the vehicle control CPU in FIG. 1.

As previously described, the vehicle control CPU 13 operates in accordance with a program stored in its internal ROM. FIG. 3 is a flowchart of this program. The program in FIG. 3 is started when a key switch of the electric vehicle is changed to an on position.

As shown in FIG. 3, a first step 100 of the program initializes variables and the input/output port in the vehicle control CPU 13. After the step 100, the program advances to a step 200.

The step 200 following the step 100 derives the present degree of depression of the accelerator pedal from the output signal of the accelerator position sensor 7. The present accelerator depression degree is denoted by "Th".

A step 300 subsequent to the step 200 derives the present motor rotational speed N from the motor rotational speed signal outputted by the motor rotation detector 6.

A step 400 following the step 300 calculates a required acceleration Acc of the electric vehicle from the present accelerator depression degree Th and the previous accelerator depression degree $Th_{n-1}$ by referring to an equation given as:

$$Acc=(Th-Th_{n-1}) \cdot C \qquad (1)$$

where "C" denotes a predetermined proportion constant. The previous accelerator depression degree $Th_{n-1}$ given In the execution cycle of the program which immediately precedes the present execution cycle thereof. The required acceleration Acc corresponds to the present rate of a variation in the accelerator depression degree.

A step 500 subsequent to the step 400 calculates a steady torque command value Ts* from the present accelerator depression degree Th and the present motor rotational speed N. Specifically, the ROM within the vehicle control CPU 13 stores a table or a map which provides a predetermined relation among the steady torque command value Ts*, the present accelerator depression degree Th, and the present motor rotational speed N. The calculation of the steady torque command value Ts* is executed by referring to this table, and by implementing interpolation.

Figure 4:
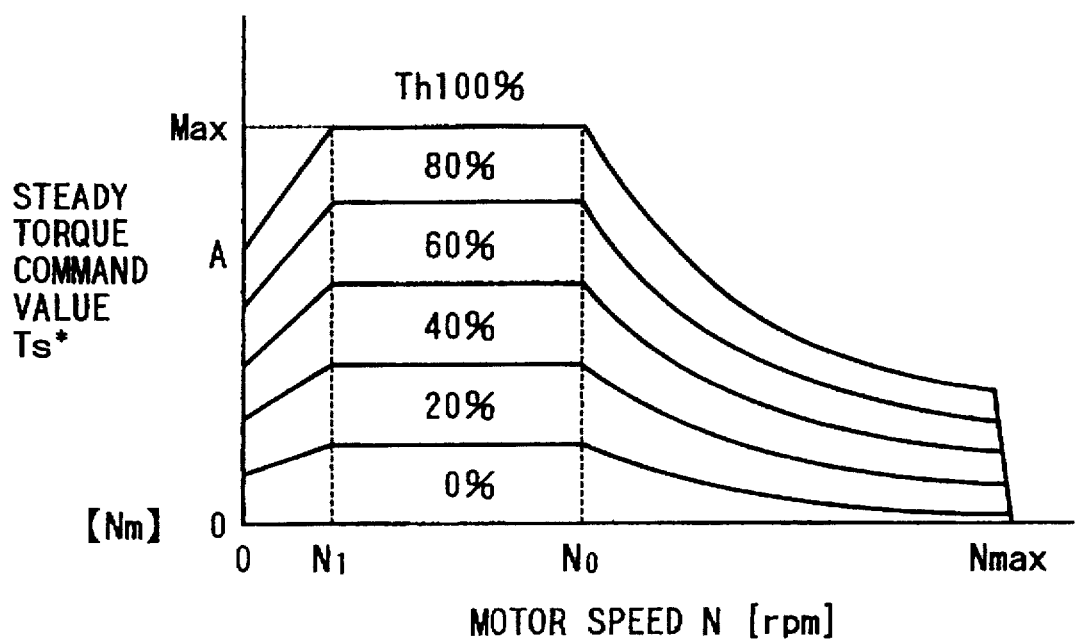
FIG. 4 is a diagram of a table which provides the relation among a steady torque command value Ts*, an accelerator depression degree Th, and a motor rotational speed N in the control apparatus of FIG. 1.

FIG. 4 shows an example of the contents of this table. With reference to FIG. 4, in the case where the present accelerator depression degree Th is equal to a value of 100%, the steady torque command value Ts* decreases along an equal power curve as the present motor rotational speed N increases from a rating speed NO of the polyphase ac motor 1. The steady torque command value Ts* drops to zero when the present motor rotational speed N reaches a maximum speed Nmax. In addition, the steady torque command value Ts* remains constant as the present motor rotational speed N decreases from the rating speed NO to a given speed N1. Further, the steady torque command value Ts* linearly decreases as the present motor rotational speed N decreases from the given speed N1. When the present motor rotational speed N is zero, the steady torque command value Ts* is equal to a given value corresponding to slightly less than a continuous output limit of the inverter 3 which occurs at a zero frequency of the output signals of the inverter 3. The steady torque command value Ts* proportionally drops as the present accelerator depression degree Th decreases.

The steady torque command value Ts* is set for the present accelerator depression degree Th equal to each of a value of 100%, a value of 80%, a value of 60%, a value of 40%, a value of 20%, and a value of 0%. The steady torque command value Ts* remains zero when the present accelerator depression degree Th is equal to a value of 0%.

Figure 5:
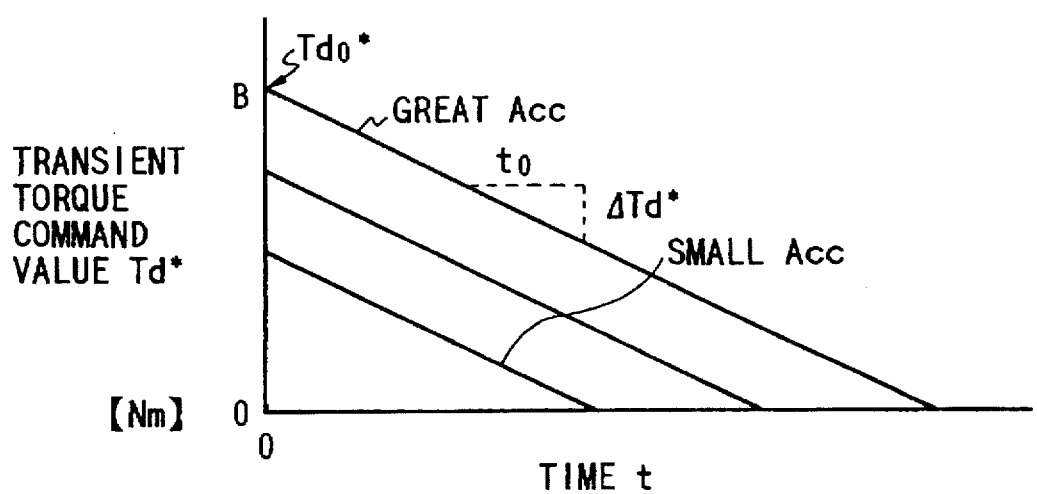
FIG. 5 is a time-domain diagram of a transient torque command value Td* in the control apparatus of FIG. 1.

With reference back to FIG. 3, a block 600 following the step 500 calculates a transient torque command value Td*. As shown in FIG. 5, the required acceleration Acc is a parameter with respect to a variation in the transient torque command value Td*. Also, the transient torque command value Td* is varied as a function of a lapse of time. A time "t" is now defined which elapses since the start of transient torque correction. When the elapsed time "t" is zero, the transient torque command value Td* is equal to an initial value Tdo* which is determined in accordance with the required acceleration Acc. The initial value Tdo* increases as the required acceleration Acc increases. The transient torque command value Td* linearly decreases from the initial value Tdo* as the elapsed time "t" increases. The rate $\Delta Td^*$ of the decrease in the transient torque command value Td* with respect to the elapsed time "t" is equal to a certain rate predetermined on the basis of the transient thermal response characteristics of the inverter 3.

Figure 6:
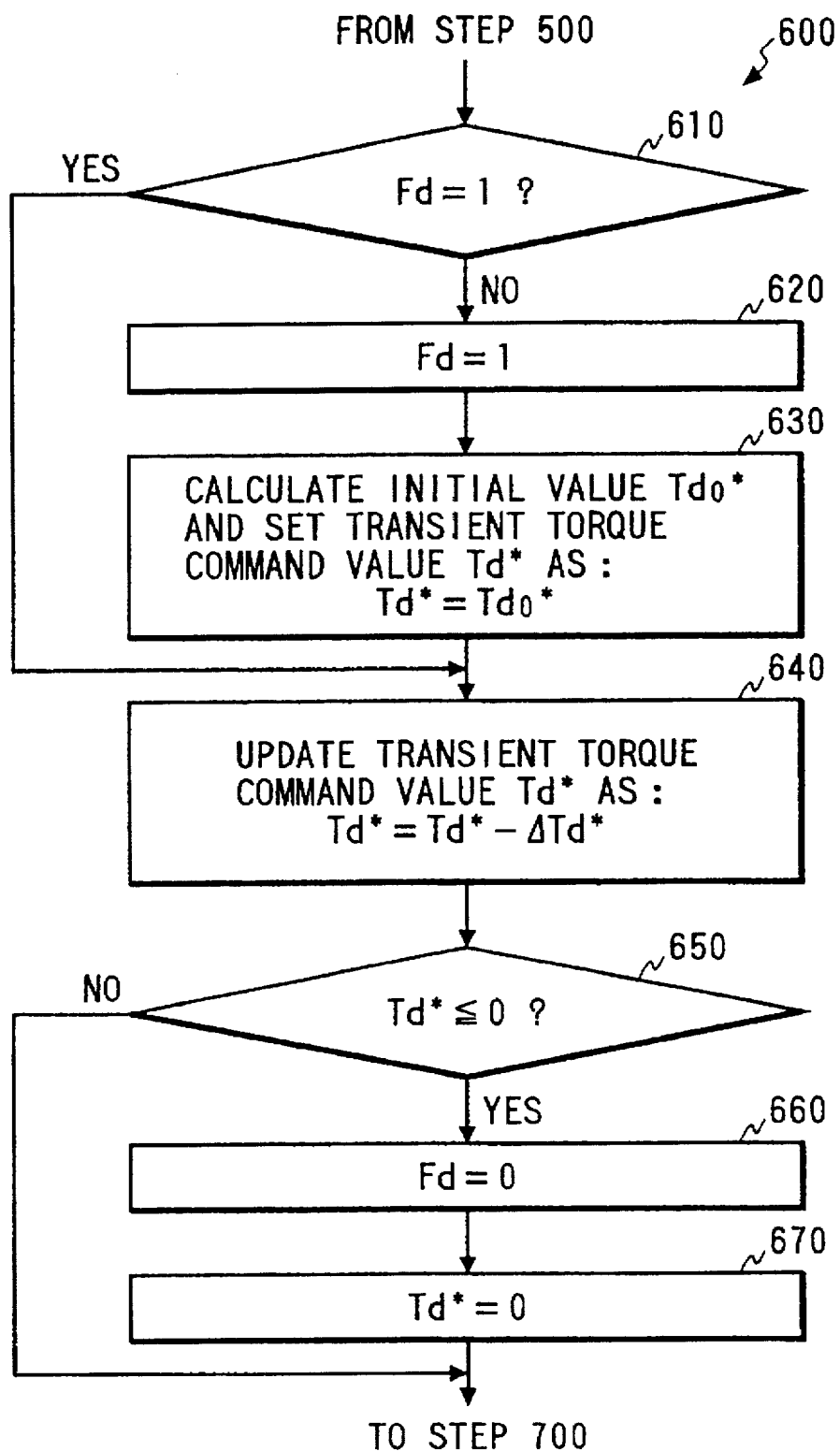
FIG. 6 is a flowchart of the details of a block in FIG. 3.

As shown in FIG. 6, a first step 610 in the block 600 decides whether or not a transient correction flag Fd is "1". It should be noted that the step 100 initializes the transient correction flag Fd to "0". When the transient correction flag Fd is not "1", the program advances from the step 610 to a step 620. When the transient correction flag Fd is "1", the program jumps from the step 610 to a step 640.

The step 620 sets the transient correction flag Fd to "1". A step 630 following the step 620 calculates an initial value Tdo* from the required acceleration Ace. The initial value Tdo* increases as the required acceleration Acc increases. For example, the initial value Tdo* is proportional to the required acceleration Ace. The step 630 sets a transient torque command value Td* to the calculated initial value Tdo* by referring to the equation as "Td*=Tdo*". After the step 630, the program advances to the step 640.

The step 640 updates and decrements the transient torque command value Td* by referring to the following program statement.

$$Td^*=Td^*-\Delta Td^* \qquad (2)$$

where "$\Delta Td^*$" denotes the predetermined decrease rate.

A step 650 following the step 640 decides whether or not the transient torque command value Td* is positive. When the transient torque command value Td* is not positive, that is, when the transient torque command value Td* is equal to or smaller than "0", the program advances from the step 650 to a step 660. When the transient torque command value Td* is positive, that is, when the transient torque command value Td* is greater than "0", the program exits from the block 600 and then advances to a step 700 in FIG. 3.

The step 660 dears the transient correction flag Fd to "0". A step 670 following the step 660 sets the transient torque command value Td* to "0". After the step 670, the program exits from the block 600 and then advances to the step 700 in FIG. 3.

With reference back to FIG. 3, the step 700 which follows the block 600 calculates a torque command value T* from the steady torque command value Ts* and the transient torque command value Td* by referring to an equation given as:

$$T^* = Ts^* + Td^* \tag{3}$$

A step 800 subsequent to the step 700 outputs information of the torque command value T* to the motor control CPU 12. A step 900 following the step 800 decides whether or not the ignition switch of the electric vehicle is in its off position. When the ignition switch is in Its off position, the program exits from the step 900 and the execution of the program ends. When the ignition switch is not in its off position, the program returns from the step 900 to the step 200.

Figure 7:
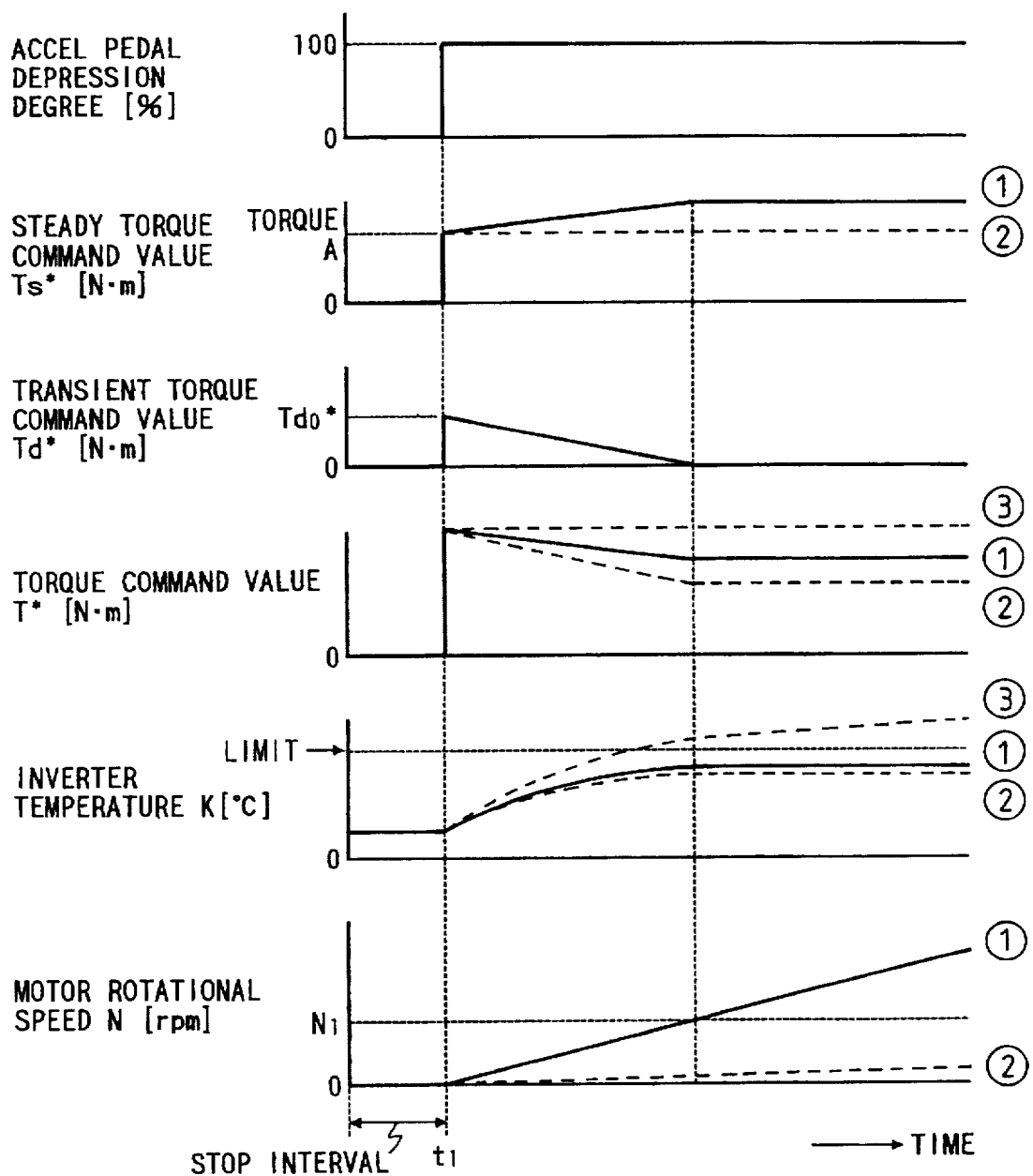
FIG. 7 is a time-domain diagram of various parameters in the control apparatus of FIG. 1 and in an assumed control apparatus.

With reference to FIG. 7, it is now assumed that the electric vehicle remains stopped on an upward slope. While the electric vehicle remains stopped, the accelerator pedal continues to be undepressed and the motor rotational speed remains zero. Accordingly, in this case, both the steady torque command value Ts* and the transient torque command value Td* are zero, and hence the torque command value T* is zero (see the time range "STOP INTERVAL" in FIG. 7).

It is also assumed that the accelerator pedal is then fully depressed at a moment t1. Since the electric vehicle has inertia, the motor rotational speed N remains zero at the moment t1. Accordingly, the steady torque command value Ts* is set to a value "A" in FIG. 4 at the moment t1.

Since the accelerator pedal is fully depressed, the required acceleration Acc is great so that the transient torque command value Td* is set to an initial value Tdo* corresponding to a value "B" in FIG. 4 at the moment t1. The torque command value T* is equal to the sum of the steady torque command value Ts* and the transient torque command value Td*. Thus, at the moment t1, the torque command value T* increases to a level corresponding to the instantaneous maximum power output of the inverter 3.

The torque command value T* decreases at a predetermined rate in accordance with a lapse of time from the moment t1 as shown by the solid line ① in FIG. 7. Therefore, during an interval from the moment t1, the temperature of the inverter 3 rises at a small rate as shown by the solid line ① in FIG. 7. Accordingly, the temperature of the inverter 3 is prevented from rising above a given limit for normal operation of the inverter 3. The motor rotational speed N increases in accordance with a lapse of time from the moment t1 as shown by the solid line ① in FIG. 7. The frequency of switching operation of the inverter 3 increases as the motor rotational speed N increases. Thus, the inverter load is prevented from concentrating on a given switching element among switching elements in the inverter 3.

In an assumed design different from this invention, during an interval from the moment t1, the torque command value T* remains equal to the level corresponding to the instantaneous maximum power output of the inverter 3 as shown by the broken line ③ in FIG. 7. In the assumed design, the temperature of the inverter 3 rises at a great rate as shown by the broken line ③ in FIG. 7, and hence exceeds the given limit for normal operation of the inverter 3.

In the case of such an upward slope that the motor rotational speed N hardly rises as shown by the broken line ② in FIG. 7, the steady torque command value Ts* remains approximately constant during an interval from the moment t1 as shown by the broken line ② in FIG. 7. The steady torque command value Ts* is set smaller than a given upper limit for normal operation of the inverter 3. After the moment t1, the transient torque command value Td* decreases at a given rate corresponding to the transient thermal time constant of the inverter 3. Accordingly, in this case, the temperature of the inverter 3 remains below the given limit for normal operation of the inverter 3 as shown by the broken line ② in FIG. 7.

Second Embodiment

Figure 8:
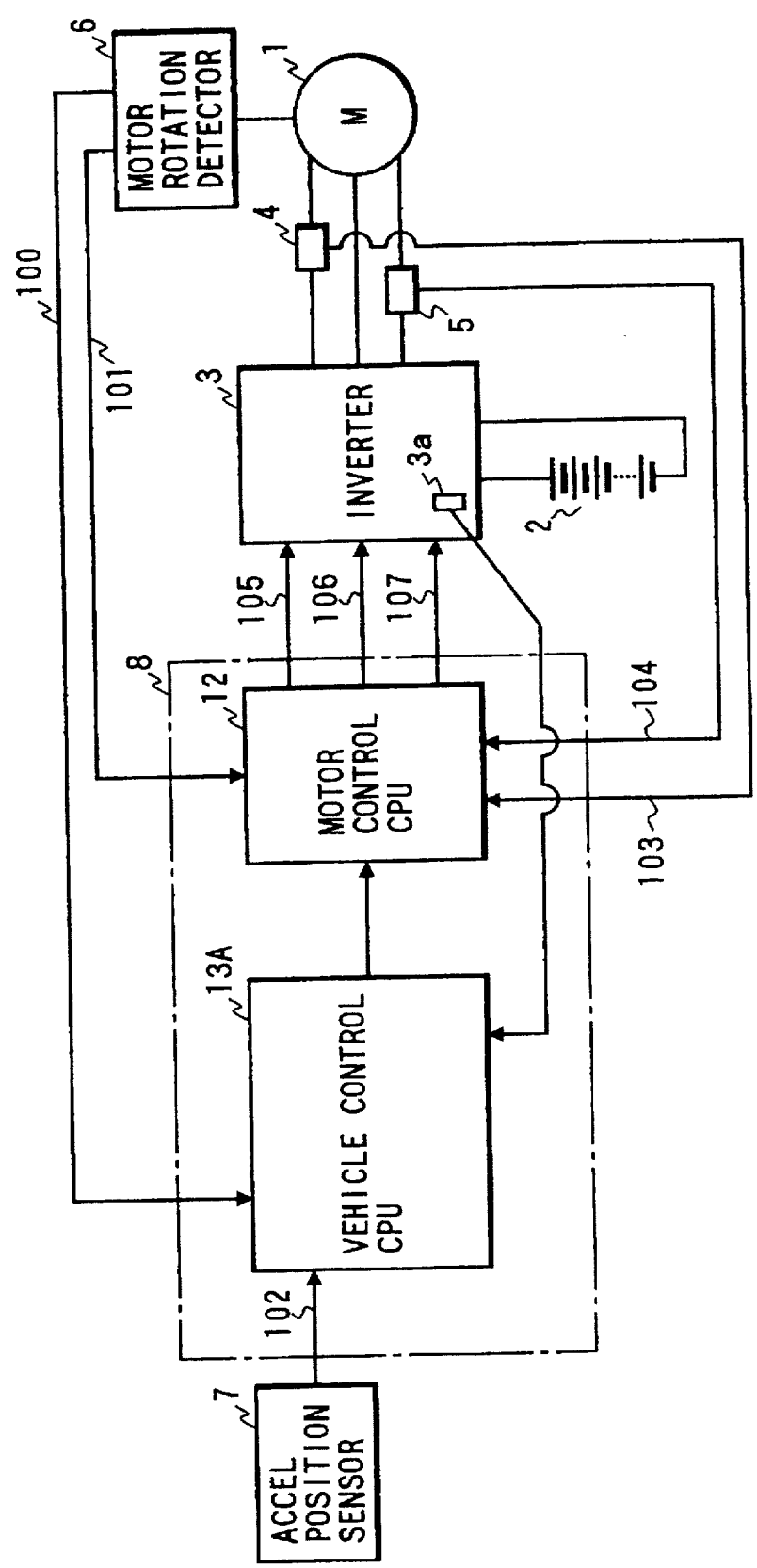
FIG. 8 is a block diagram of a control apparatus according to a second embodiment of this invention.

FIG. 8 shows a second embodiment of this invention which is similar to the embodiment of FIGS. 1–7 except for design changes indicated hereinafter. The embodiment of FIG. 8 has a vehicle control CPU 13A instead of the vehicle control CPU 13 in FIG. 1. The embodiment of FIG. 8 includes a temperature sensor 3a provided in an inverter 3. The temperature sensor 3a detects the temperature of the inverter 3. The detected inverter temperature is denoted by "K". The temperature sensor 3a outputs a signal of the inverter temperature K to a signal line 108 leading to the vehicle control CPU 13A.

Figure 9:
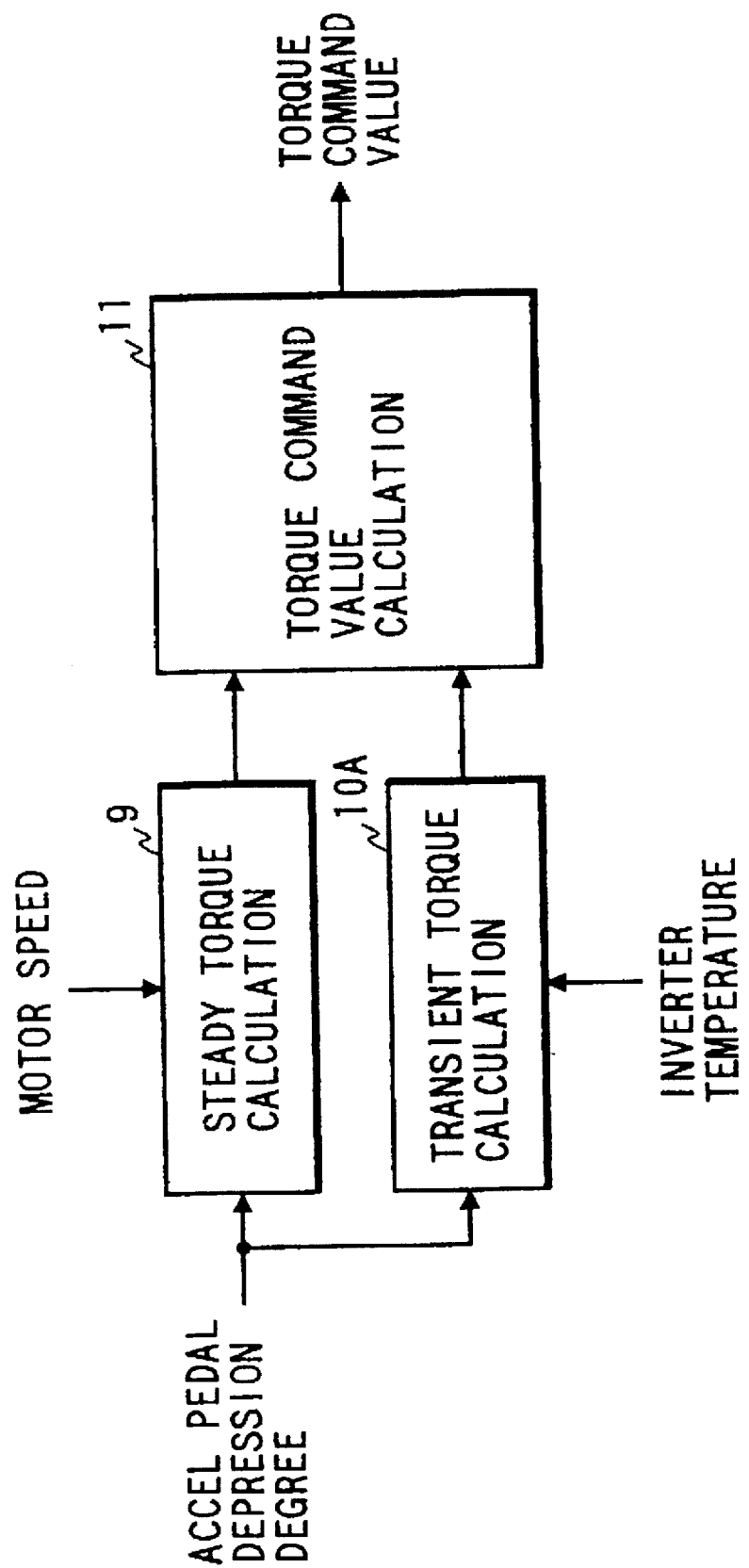
FIG. 9 is a flow diagram of operation of a vehicle control CPU in FIG. 8.

FIG. 9 is a flow diagram of operation of the vehicle control CPU 13A. It should be noted that FIG. 9 does not show the structure of the hardware of the vehicle control CPU 13A. With reference to FIG. 9, a block 10A replaces the block 10 in FIG. 2. The block 10A derives the present degree of depression of an accelerator pedal from the output signal of an accelerator position sensor 7 (see FIG. 8). The block 10A stores the present degree of depression of the accelerator pedal for later use. The block 10A calculates the present rate of a variation in the degree of depression of the accelerator pedal from the previous and present degrees of depression of the accelerator pedal. The block 10A derives the present inverter temperature from the output signal of the temperature sensor 3a (see FIG. 8). The block 10A calculates a transient torque command value from the present inverter temperature and the present rate of the variation in the degree of depression of the accelerator pedal.

Figure 10:
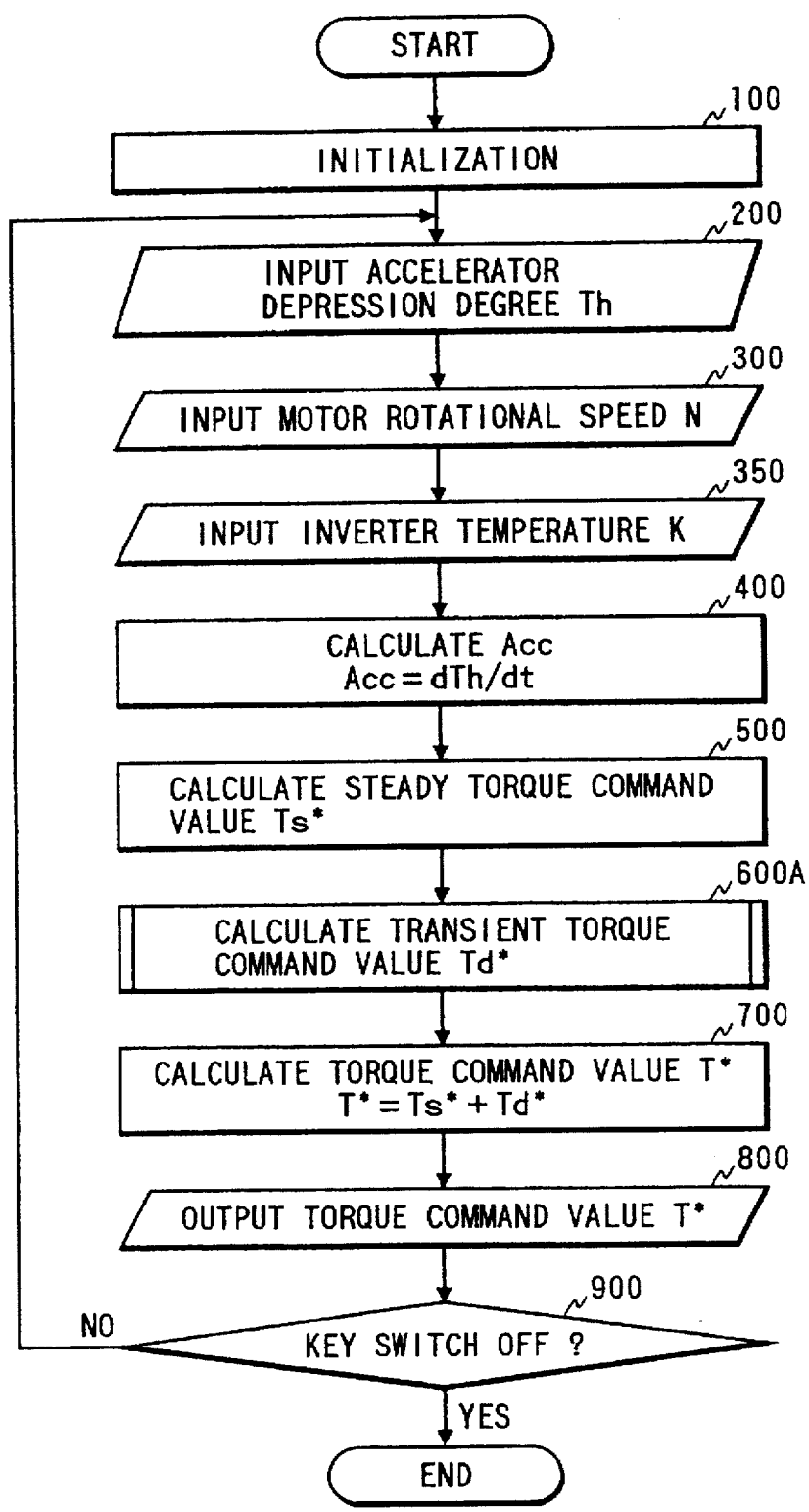
FIG. 10 is a flowchart of a program for the vehicle control CPU in FIG. 8.

FIG. 10 is a flowchart of a program for the vehicle control CPU 13A. The program in FIG. 10 has a step 350 between steps 300 and 400. The step 350 derives the present inverter temperature K from the output signal of the temperature sensor 3a (see FIG. 8). The program in FIG. 10 has a block 600A which replaces the block 600 in FIG. 3.

Figure 11:
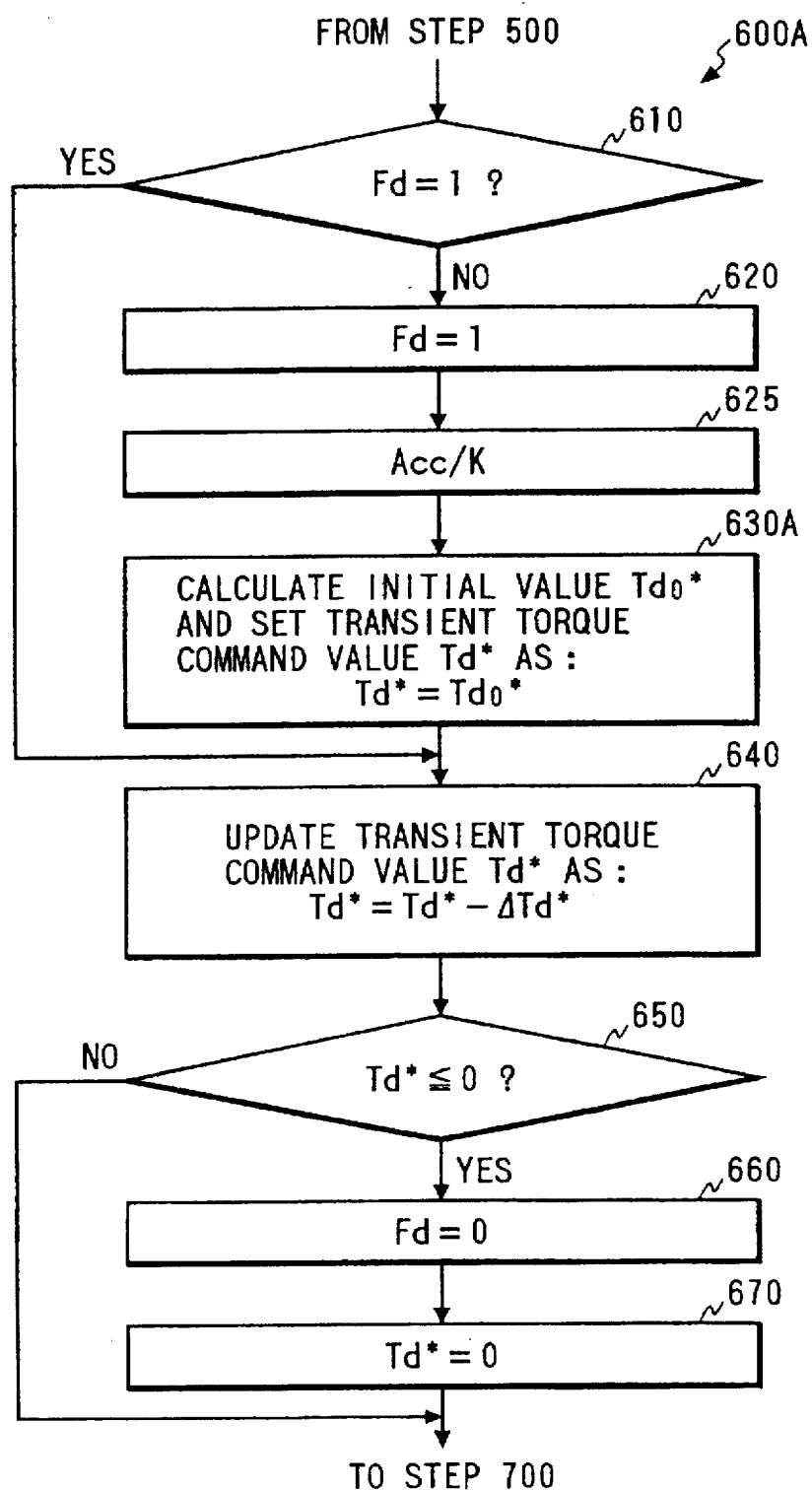
FIG. 11 is a flowchart of the details of a block in FIG. 10.

FIG. 11 shows the details of the block 600A in FIG. 10. As shown in FIG. 11, the block 600A has a step 630A which replaces the step 630 in FIG. 6. The block 600A has a step 625 between a step 620 and the step 630A. The step 625 calculates a value Acc/K which is equal to a required acceleration Acc divided by the present inverter temperature K. The step 630A calculates an initial value Tdo* from the value Acc/K. The initial value Tdo* is proportional to the required acceleration Acc. The initial value Tdo* is inversely proportional to the present inverter temperature K. The step 630A sets a transient torque command value Td* to the calculated initial value Tdo* by referring to the equation as "Td*=Tdo*".

Figure 12:
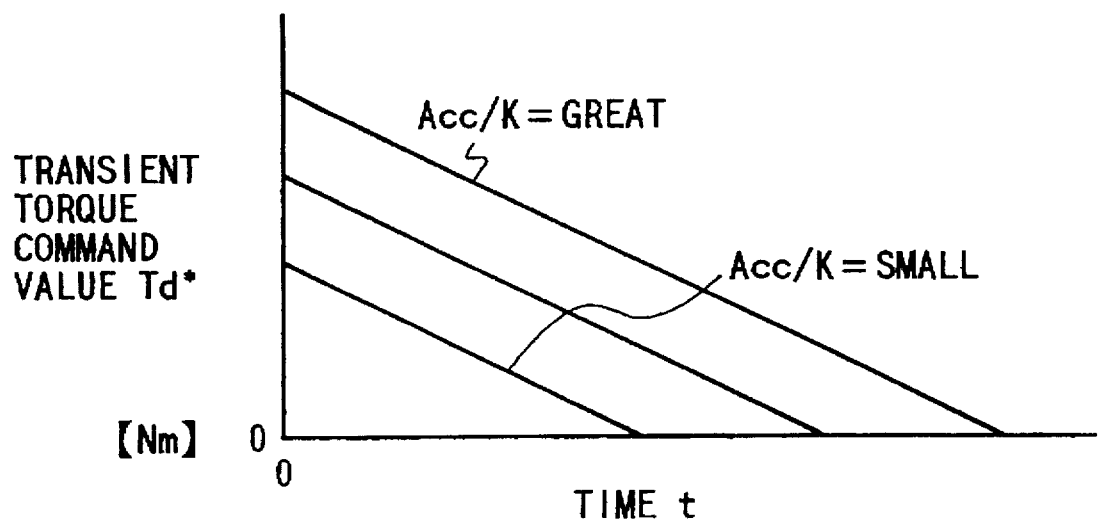
FIG. 12 is a time-domain diagram of a transient torque command value Td* in the control apparatus of FIG. 8.

With reference to FIG. 12, when the present inverter temperature K is low, the value Acc/K is great so that the initial value Tdo* of the transient torque command value Td* is also great. This is advantageous in enhancing the acceleration ability of the electric vehicle. When the present inverter temperature K is high, the value Acc/K is small so that the initial value Tdo* of the transient torque command value Td* is also small. This is advantageous in protecting switching elements in the inverter 3.

Third Embodiment

A third embodiment of this invention is similar to the embodiment of FIGS. 1–7 or the embodiment of FIGS. 8–12 except for the following design change.

Figure 13:
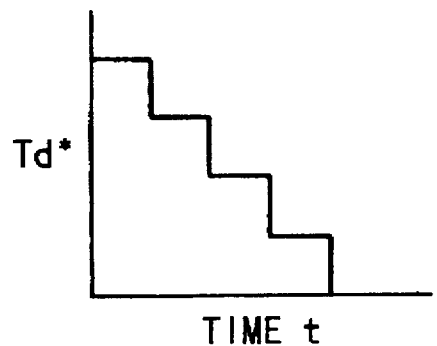
FIG. 13 is a time-domain diagram of a transient torque command value Td* in a control apparatus according to a third embodiment of this invention.

In the third embodiment of this invention, as shown in FIG. 13, a transient torque command value Td* is decreased stepwise from its initial value Tdo* in accordance with a lapse of time. The time interval for which the transient torque command value Td* is decreased from its initial value Tdo* to zero is equal to, for example, several seconds.

Fourth Embodiment

A fourth embodiment of this invention is similar to the embodiment of FIGS. 1–7 or the embodiment of FIGS. 8–12 except for the following design change.

Figure 14:
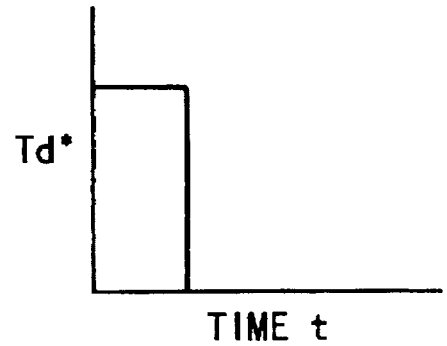
FIG. 14 is a time-domain diagram of a transient torque command value Td* in a control apparatus according to a fourth embodiment of this invention.

In the fourth embodiment of this invention, as shown in FIG. 14, a transient torque command value Td* remains equal to its initial value Tdo* until the lapse of time reaches a given time interval equal to, for example, about one second. The transient torque command value Td* is decreased to zero when the lapse of time reaches the given time interval.

What is claimed is:

1. A control apparatus for an electric vehicle, comprising:

accelerator depression degree detecting means for detecting a degree of depression of an accelerator pedal in the electric vehicle, and for outputting an accelerator depression degree signal representing the detected degree of depression of the accelerator pedal;

a polyphase ac motor for driving the electric vehicle;

motor rotation detecting means for detecting a rotational speed of the polyphase ac motor, and for outputting a motor rotational speed signal representing the detected rotational speed of the polyphase ac motor;

a battery in the vehicle for generating dc power;

an inverter for changing the dc power generated by the battery into ac power through pulse width modulation responsive to a PWM modulation signal, and for outputting the ac power to the polyphase ac motor to drive the polyphase ac motor;

steady torque calculating means for calculating a command value of a steady torque generated by the polyphase ac motor on the basis of the motor rotational speed signal and the accelerator depression degree signal;

transient torque calculating means for deriving a rate of a variation in the accelerator depression degree signal, and for calculating a transient torque command value on the basis of the variation rate of the accelerator depression degree signal;

torque command value calculating means for calculating a command value of a torque generated by the polyphase ac motor on the basis of the steady torque command value and the transient torque command value; and motor control means for generating the PWM modulation signal in response to the torque command value calculated by the torque command value calculating means, and for outputting the PWM modulation signal to the inverter to control the polyphase ac motor.

2. A control apparatus as recited in claim 1, wherein the torque command value calculating means is operative for calculating the torque command value by adding the steady torque command value and the transient torque command value.

3. A control apparatus as recited in claim 1, wherein the steady torque calculating means is operative for calculating the steady torque command value which corresponds to a maximum value of output of the inverter when the motor rotational speed is equal to or higher than a given speed, which decreases as the motor rotational speed decreases from the given speed, and which is equal to a given value smaller than the maximum value of output of the inverter when the motor rotational speed is zero.

4. A control apparatus as recited in claim 1, wherein the transient torque calculating means is operative for calculating an initial value on the basis of the variation rate of the accelerator depression degree signal, and for calculating the transient torque command value which decreases from the initial value in accordance with a lapse of time.

5. A control apparatus as recited in claim 4, further comprising a temperature sensor for detecting a temperature of the inverter, and wherein the transient torque calculating means is operative for changing the initial value and a rate of the decrease in the transient torque command value in response to the inverter temperature detected by the temperature sensor.

6. A control apparatus for an electric vehicle having an accelerator pedal, the apparatus comprising:

first means for detecting a degree of depression of the accelerator pedal;

second means connected to the first means for calculating a rate of an increase in the accelerator pedal depression degree detected by the first means;

a polyphase ac motor for driving the electric vehicle;

third means connected to the polyphase ac motor for detecting a rotational speed of the polyphase ac motor;

fourth means connected to the first means and the third means for calculating a first command value on the basis of the accelerator pedal depression degree detected by the first means and the motor rotational speed detected by the third means, the first command value relating to a torque generated by the polyphase ac motor;

fifth means connected to the second means for calculating a second command value on the basis of the increase rate calculated by the second means, the second command value relating to the torque generated by the polyphase ac motor;

sixth means connected to the fourth means and the fifth means for calculating a third command value on the basis of the first command value calculated by the fourth means and the second command value calculated by the fifth means, the third command value relating to the torque generated by the polyphase ac motor; and seventh means connected to the sixth means and the polyphase ac motor for controlling the polyphase ac motor in response to the third command value calculated by the sixth means.

7. A control apparatus as recited in claim 6, further comprising an inverter provided in the seventh means and connected to the polyphase ac motor for driving the polyphase ac motor, eighth means connected to the inverter for detecting a temperature of the inverter, and ninth means connected to the fifth means and the eighth means for varying the second command value in response to the inverter temperature detected by the eighth means.

* * * * *